(12) United States Patent
Trapani et al.

(10) Patent No.: US 10,767,805 B2
(45) Date of Patent: Sep. 8, 2020

(54) PIPE LINING SYSTEMS AND METHODS OF USE

(71) Applicant: BLD Services, LLC, Kenner, LA (US)

(72) Inventors: Jacob Trapani, Kenner, LA (US); Charles Leroy Bolton, Kenner, LA (US); Jimmy Dale Ladner, Kenner, LA (US); Timothy Michael Matheson, Kenner, LA (US)

(73) Assignee: BLD Services, LLC, Kenner, LA (US)

( * ) Notice: Subject to any disclaimer, the term of this patent is extended or adjusted under 35 U.S.C. 154(b) by 0 days.

(21) Appl. No.: 15/663,549

(22) Filed: Jul. 28, 2017

(65) Prior Publication Data

US 2018/0031167 A1 Feb. 1, 2018

Related U.S. Application Data

(60) Provisional application No. 62/367,941, filed on Jul. 28, 2016.

(51) Int. Cl.
*F16L 55/16* (2006.01)
*F16L 55/165* (2006.01)
*F16L 55/179* (2006.01)
*F16L 55/163* (2006.01)
*F16L 55/1645* (2006.01)

(52) U.S. Cl.
CPC ......... *F16L 55/1654* (2013.01); *F16L 55/179* (2013.01); *F16L 55/163* (2013.01); *F16L 55/1651* (2013.01); *F16L 55/1656* (2013.01); *F16L 55/16455* (2013.01)

(58) Field of Classification Search
CPC ... F16L 55/1654; F16L 55/163; F16L 55/179; F16L 55/16455; F16L 55/1651
USPC .......... 138/97, 98; 405/150.1, 184.2
See application file for complete search history.

(56) References Cited

U.S. PATENT DOCUMENTS

| | | | |
|---|---|---|---|
| 4,366,012 A | 12/1982 | Wood | |
| 4,581,247 A * | 4/1986 | Wood | B29C 35/08 156/199 |
| 5,108,533 A * | 4/1992 | Long, Jr. | B29C 63/36 156/287 |
| 5,609,439 A * | 3/1997 | Schreiner | E03F 3/06 156/156 |
| 5,692,543 A * | 12/1997 | Wood | F16L 55/179 138/97 |
| 5,765,597 A | 6/1998 | Kiest, Jr. et al. | |

(Continued)

OTHER PUBLICATIONS

De neef (*De neef 2002*), "Swellseal® hydrophilic Waterstop Solutions," (2002, last accessed: May 2, 2014) available at <URL: http://www.deneef.com/USA/index2.php?option=com_docman&task=doc_view&gid=547&Itemid=35>.

(Continued)

*Primary Examiner* — James F Hook
(74) *Attorney, Agent, or Firm* — Arnall Golden Gregory LLP

(57) ABSTRACT

Systems and methods for pipe lining systems and methods of use are described. Systems and methods may include a CIPP lateral liner that is inserted into a bladder forming a CIPP liner assembly that can be inserted into a pipe line for a pipe repair. CIPP liner assembly can include a membrane that produces superior results compared to the prior art. A backing ring may be used with these systems and methods.

22 Claims, 12 Drawing Sheets

(56) References Cited

U.S. PATENT DOCUMENTS

| | | | |
|---|---|---|---|
| 5,794,663 A | 8/1998 | Kiest, Jr. et al. | |
| 5,915,419 A | 6/1999 | Tweedie et al. | |
| 6,006,787 A * | 12/1999 | Kamiyama | F16L 55/179 138/97 |
| 6,029,726 A * | 2/2000 | Tweedie | B29C 63/28 156/379.6 |
| 6,039,079 A | 3/2000 | Kiest, Jr. | |
| 6,068,725 A | 5/2000 | Tweedie et al. | |
| 6,152,184 A * | 11/2000 | Kamiyama | B29C 63/36 138/97 |
| 6,199,591 B1 | 3/2001 | Kiest, Jr. et al. | |
| 6,206,049 B1 * | 3/2001 | Ward | F16L 55/179 138/97 |
| 6,942,426 B1 | 9/2005 | Kampbell et al. | |
| 6,994,118 B2 | 2/2006 | Kiest, Jr. et al. | |
| 7,135,087 B2 | 11/2006 | Blackmore et al. | |
| 7,481,246 B2 * | 1/2009 | Kamiyama | F16L 55/179 138/97 |
| 7,503,349 B2 | 3/2009 | Kamiyama et al. | |
| 7,975,726 B2 | 7/2011 | Kiest, Jr. | |
| 7,987,873 B2 * | 8/2011 | Kiest, Jr. | F16L 55/163 138/97 |
| 8,667,991 B2 | 3/2014 | Kiest, Jr. | |
| 8,667,992 B2 | 3/2014 | Kiest, Jr. | |
| 9,933,105 B1 * | 4/2018 | Botts | F16L 55/165 |
| 2008/0029177 A1 * | 2/2008 | Kamiyama | F16L 55/179 138/98 |
| 2008/0245433 A1 * | 10/2008 | Warren | F16L 55/179 138/98 |
| 2013/0249208 A1 * | 9/2013 | Kiest, Jr. | F16L 55/179 285/55 |
| 2017/0146178 A1 * | 5/2017 | Kiest, Jr. | F16L 55/165 |
| 2018/0299058 A1 * | 10/2018 | Botts | F16L 55/179 |
| 2019/0107241 A1 * | 4/2019 | Kiest, Jr. | F16L 55/1654 |

OTHER PUBLICATIONS

De neef (*De neef 2006*), "Installation Instructions, Swellseal® WA," (Mar. 2006, last accessed: Apr. 30, 2014), available at <URL: http://www.karaysa.com/products/pdf/waterstops-swellseal-wa.pdf>.

De neef, "Case History: LDH Energy—Hydro Active® Combi Grout," (last accessed Aug. 21, 2014) available at <URL: http://www.deneef.com/USA/index2.php?option=com_docman&task=doc_view&gid=660&Itemid=35>.

De neef, "Technical Information Waterstops, Swellseal® WA," (Mar. 2006), available at: http://web.archive.org at <URL: http://www.deneef.com/index.php?option=com_docman&task=doc_view&gid=163&Itemid=35>. Also available atr <URL: http://www.google.com/url?sa=t&rct=j&q=&esrc=s&source=web&cd=2&ved=0ahUKEwj8uOWq06zVAhVIjz4KHR1mBEcQFggtMAE&url=http%3A%2F%2Fwww.dissco.net%2FPDF%2520Files%2FDeNeef%2FTDS_Swellseal_WA.pdf&usg=AFQjCNGsVmQdlUI1Uaqugj18eF7KwfGJkg>.

Kiest Jr. et al., "A case study in infiltration reduction through trenchless technology," South Palos township sanitary district Cook County, Illinois, (Mar. 1999, last accessed: May 2, 2014) available at <URL: http://www.lmktechnologies.com/images/pdfs/tliner-case-study-infiltration-reduction.pdf>.

Kiest Jr., "Making it Stick, Contractors repairing sewer laterals with CIPP linings need to consider multiple factors that affect the quality of the lateral-to-main connection," (last accessed: May 8, 2014) available at <URL: http://www.lmktechnologies.com/images/pdfs/tliner-making-it-stick.pdf>.

\* cited by examiner

PIPE LINING SYSTEMS AND METHODS OF USE

INCORPORATION BY REFERENCE TO RELATED APPLICATIONS

This application claims priority to of U.S. Provisional Application No. 62/367,941 filed Jul. 28, 2016, the contents of which is incorporated by reference herein in its entirety.

FIELD OF THE INVENTION

The present invention relates to systems and methods for a pipe lining system, methods of making a pipe lining system, and methods of using a pipe lining system.

BACKGROUND OF THE INVENTION

Needs exist for improved systems and methods for repairing pipes, including underground sewer pipes. Underground pipes can leak or become susceptible to inflow and infiltration ("I/I") for a number of reasons. Junctures where lateral pipe lines meet or branch from main line pipes are one area that can require unique repair methods.

Lateral pipe lines are often the pipes that lead from a main pipe line to smaller pipes or homes. For example, main pipe lines often run generally horizontally relative to the ground and a lateral pipe line is installed at some upward angle off of the main pipe line. A lateral pipe line may be positioned at 90 degrees relative to a main pipe, i.e., a "T", or an angle less than 90 degrees, i.e., a "Y". At times, lateral pipe lines are installed after main pipe lines have been installed and the juncture may have never been properly sealed.

In some situations, a hole may be required in a main pipe line, e.g., for a lateral pipe line to be inserted or connected to the main pipe line. This may allow for I/I from the moment the lateral pipe line is installed. Even for lateral pipe lines initially installed correctly, problems can arise over time that damage or weaken the juncture allowing for I/I. The surrounding earth may shift, plant roots may infiltrate the juncture, or flexural problems such as those from cars passing over underground pipes, may arise and cause I/I at the juncture.

Prior art devices and methods have attempted to solve this problem using various cured-in-place pipe (CIPP) repairs devices but have not done so successfully. Some prior art methods rely on a "T" or "Y" shaped liner that is inserted in the main pipe line and lateral pipe line to repair the damaged juncture. These devices and methods, however, have not achieved sufficient results. Moreover, positioning the repair device in the pipe so that it can be positioned in the correct location underground can be time consuming and difficult, especially once a liner is saturated in resin. A prior art example is described in U.S. Pat. No. 6,039,079, which is incorporated by reference in its entirety, but the examples of that disclosure do not adequately solve the problems solved by the devices and methods described herein, such as inter alia, providing improved adherence to a host pipe. Another prior art example that did not solve the problems solved by the devices and methods described herein is U.S. Pat. No. 7,503,349, which is incorporated by reference in its entirety.

BRIEF DESCRIPTION OF THE DRAWINGS

The drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
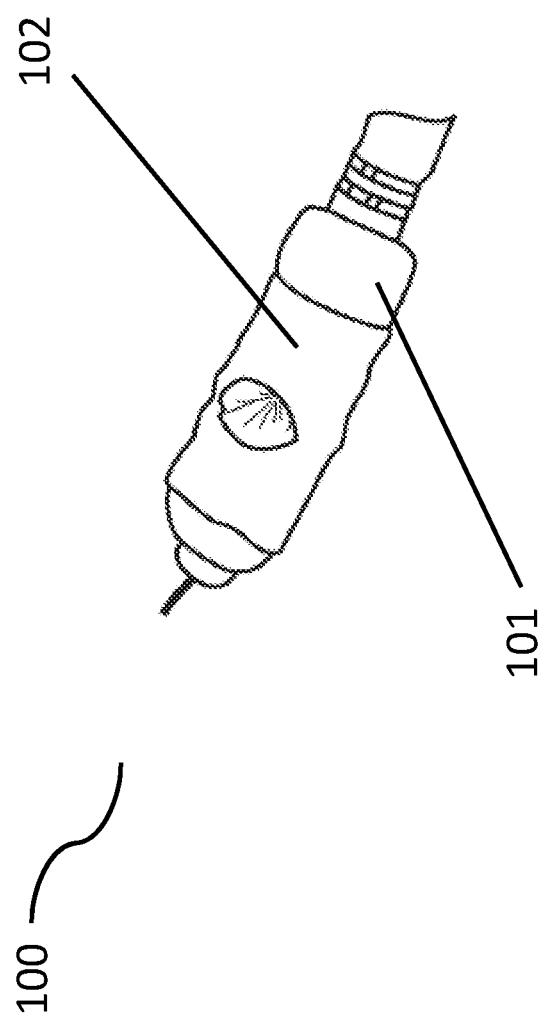
FIG. 1 shows one CIPP liner of embodiments of the present invention positioned on a bladder.

The examples described herein relate to pipe lining systems and methods of use. These examples are for illustrative purposes only.

An embodiment of the invention is an apparatus comprising: a CIPP liner assembly comprising a main line liner and a CIPP lateral liner; a bladder comprising a main liner bladder and a lateral installation bladder; wherein said main line liner comprises a felt layer and a membrane; wherein said CIPP lateral liner comprises a CIPP lateral liner felt layer and a CIPP lateral liner membrane; wherein said felt layer is positioned so that it is contacting said main line liner; wherein said CIPP lateral liner is positioned inside of said lateral installation bladder and said CIPP lateral liner and said lateral installation bladder are positioned inside of said main liner bladder; and said CIPP lateral liner membrane is positioned so that it is contacting said lateral installation bladder.

A method of the invention is a method of positioning a CIPP liner on a bladder, the steps comprising: providing a CIPP liner wherein said CIPP liner comprises a main line liner and a CIPP lateral liner and the CIPP lateral liner is attached to said main line liner, forming a T-shape; providing a bladder wherein said bladder comprises a main liner bladder and a lateral installation bladder and said lateral installation bladder is attached to said main liner bladder, forming a T-shape; forming a U-shape with a first end of said CIPP lateral liner; inserting said U-shaped first end of said CIPP lateral liner into a first end of a lateral installation bladder so that a CIPP lateral liner membrane faces an inner diameter of said lateral installation bladder; positioning said CIPP lateral liner and said lateral installation bladder inside of said main liner bladder; wrapping said main line liner comprising a felt layer and a membrane around said main liner bladder so that said membrane is facing an outer diameter of said main liner bladder; and securing said main line liner to said bladder.

Another embodiment of the invention is a backing ring comprising: an inward facing portion and an outward facing portion a first edge portion around an outer circumference of said backing ring, and a second edge portion around in inner circumference of said backing ring; an edge portion around a circumference of said backing ring; and said backing ring comprises a felt.

An embodiment of the invention is an apparatus, comprising: a CIPP liner; a backing ring comprising: an inward-facing portion, an outward-facing portion, a first edge portion around an outer circumference of said backing ring, and a second edge portion around an inner circumference of said backing ring; wherein said inward-facing portion is attached to said CIPP liner; said backing ring further comprises a bonded portion and an unbonded portion, wherein said unbonded portion comprises a pocket; and said backing ring is positioned on or around a lateral opening of said CIPP liner.

One method of the invention is a method of repairing a lateral junction of a pipe, the method comprising: providing a CIPP liner; providing a backing ring comprising: an inward-facing portion, an outward-facing portion, a first edge portion around an outer circumference of said backing ring, and a second edge portion around an inner circumference of said backing ring; wherein said backing ring is attached to said CIPP liner with said inward facing portion toward said CIPP liner; positioned on or around a lateral opening of said CIPP liner; bonding a portion of said backing ring to said CIPP liner; and forming an unbonded portion of said backing ring comprising a pocket.

Certain embodiments may comprise everting a lateral pipe liner into a lateral pipe and compressing said hydrophilic material between said cured-in-place pipe liner and said backing ring while pressing said outward-facing portion of said backing ring against the inside of a pipe.

Certain embodiments may comprise everting a lateral pipe liner into a lateral pipe and compressing said hydrophilic material between said cured-in-place pipe liner and said backing ring while pressing said outward-facing portion of said backing ring against a juncture of a main pipe and a lateral pipe.

Certain embodiments may comprise a method of positioning a cured-in-place (CIPP) liner on a bladder, the steps comprising: providing a CIPP liner wherein said CIPP liner comprises a main line liner and a CIPP lateral liner and the CIPP lateral liner is attached to said main line liner, forming a T-shape; providing a bladder wherein said bladder comprises a main liner bladder and a lateral installation bladder and said lateral installation bladder is attached to said main liner bladder, forming a T-shape; forming a U-shape with a first end of said CIPP lateral liner; inserting said U-shaped first end of said CIPP lateral liner into a first end of a lateral installation bladder so that a CIPP lateral liner membrane faces an inner diameter of said lateral installation bladder; positioning said CIPP lateral liner and said lateral installation liner inside of said main liner bladder; wrapping said main line liner comprising a felt layer and a membrane around said main liner bladder so that said membrane is facing an outer diameter of said main liner bladder; and securing said main line liner to said bladder.

FIG. 1 shows CIPP liner assembly 100 positioned on bladder 101 where CIPP liner assembly 100 is ready to be inserted into a pipe line for a repair. CIPP liner 102 can comprise a felt material, a needled felt material, a polyester, a glass material, a knit material and mixtures thereof. In certain embodiments, a felt layer may comprise a felt material comprising a fiberglass. As used herein, the terms "felt" and "felt layer" can be used to refer to any one of or combination of these materials and the meaning will be clear to the ordinarily skilled artisan when considering the context in which the term is used.

Figure 2:
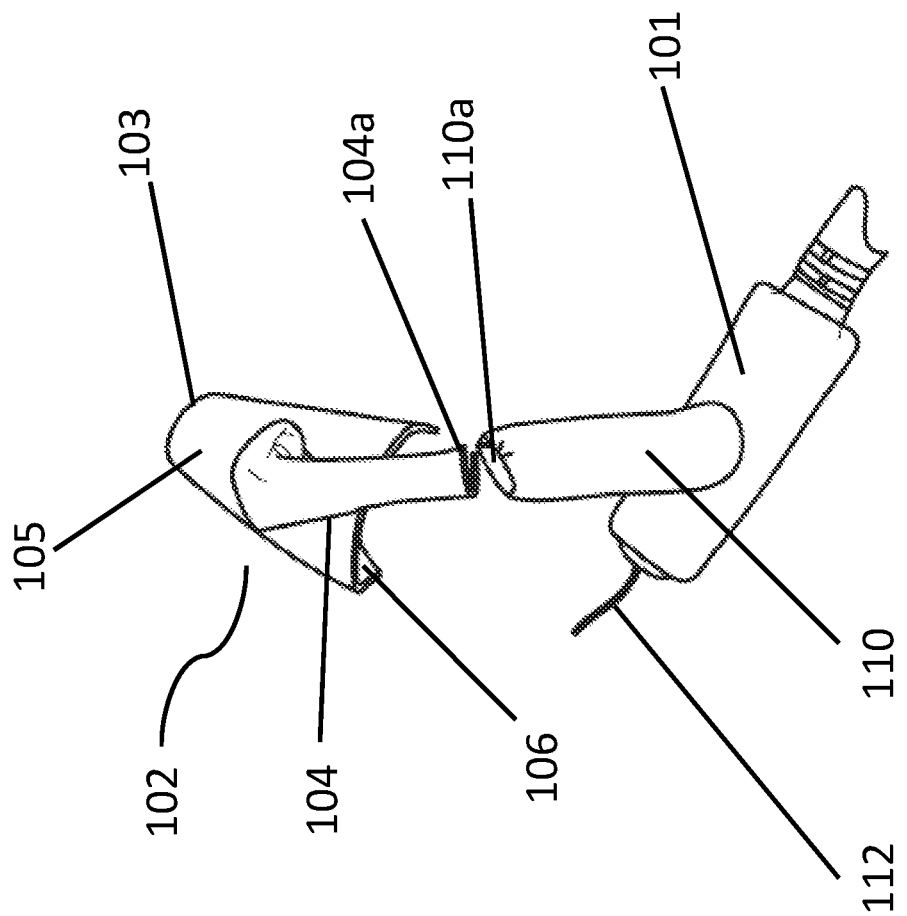
FIG. 2 shows a view of a CIPP liner of embodiments of the present invention as it is being inserted into a bladder.

In certain embodiments, CIPP liner 102 comprises membrane 105 on a side of CIPP liner 102 as seen in FIG. 2.

CIPP liner 102 can be impregnated with resin prior to attaching CIPP liner 102 to bladder 101. When impregnating CIPP liner 102 with resin, felt layer 106 of CIPP liner 102 can be impregnated with resin. Membrane 105 can allow for a vacuum to be applied to CIPP liner 102 by acting as a layer that is impermeable to air. A vacuum can be applied using a pump. A vacuum can be applied to CIPP lateral liner 104 and can be applied when membrane 105 is facing outward and felt layer 106 is facing inward. Resin can then be applied to the inward-facing felt layer of CIPP liner 102. Membrane 105 can be transparent or translucent to allow felt layer 106 of CIPP liner 102 to be visible through membrane 105, which can allow for visible inspection of resin saturation in the felt layer during and after resin impregnation.

In certain embodiments, membrane 105 can be opaque. In some embodiments, membrane 105 can comprise a material that changes color when it comes into contact with a liquid, such as water or a resin. In certain embodiment, felt layer 106 can comprise a material that changes color when it comes into contact with a liquid, such as water or a resin.

In certain embodiments, CIPP lateral liner 104, as seen in FIG. 2, can be tubular in shape and felt layer 106 forms an inner circumference of CIPP lateral liner 104 and membrane 105 forms an outer circumference of CIPP lateral liner 104.

Applying a vacuum to CIPP liner 102 can allow for efficient and improved saturation of felt layer 106 of CIPP liner 102. Improved saturation and penetration of resin into felt layer 106 produces superior results when a liner is installed into a pipe line because it allows for greater strength and resiliency once CIPP liner 102 is cured. By positioning membrane 105 so that it faces outward and felt layer 106 faces inward, a vacuum can be applied to CIPP liner 102 without the use of a bag or other additional sealing material that is used as an air-tight barrier to form a vacuum. CIPP liner 102, as disclosed herein, can have a vacuum applied to CIPP liner 102 using a pump connected directly to the CIPP liner 102. In some embodiments, a CIPP Liner 102 can be folded so that folding can cause contact between a first folded edge and a second folded edge. In some embodiments these edges can be sealed when applying a vacuum to a CIPP liner 102, allowing for improved resin saturation.

A pump can be attached to CIPP lateral liner 104 and or CIPP liner 102, at a port, hole, or the like formed in CIPP liner 102 and/or CIPP lateral liner 104. A hose or the like can be attached to the port, hole, or the like to form an air connection between a pump and CIPP lateral liner 104. Upon activating the pump, a vacuum can be applied to the inside of CIPP lateral liner 104. By removing the air from inside CIPP lateral liner 104, resin can more thoroughly penetrate and saturate CIPP lateral liner felt layer 108.

Applying a vacuum to a CIPP lateral liner 104 while the CIPP lateral liner membrane 107 is facing outward and CIPP lateral liner felt layer 108 is facing inward and subjected to a vacuum allows for the unexpectedly superior results of achieving a better vacuum than has been achieved in the past and also allows for improved resin impregnation resulting in improved pipe repairs. When applying a vacuum, a membrane can be advantageously positioned so that a felt layer 106 faces inward while membrane 105 faces outward, producing the unexpectedly superior results of improving a vacuum, which can improve resin impregnation.

Membrane 105 can be polyurethane, polypropylene, polyethylene, and the like, and combinations thereof. In some embodiments, membrane 105 and/or CIPP lateral liner membrane 107 can be transparent, translucent, or opaque. In some embodiments, membrane 105 and/or CIPP lateral liner membrane 107 can be permeable, semi-permeable, or impermeable to air and liquids. In certain embodiments CIPP liner 102 may be cured using steam or water. In certain embodiments, a CIPP liner may be cured using ambient temperatures. Membrane 105 can comprise a polymer. Membrane 105 can be applied to CIPP liner 102 before or during its manufacture and/or can be applied at a job site.

FIG. 2 shows CIPP liner 102 and bladder 101 where CIPP liner 102 comprises a main line liner 103 and a CIPP lateral liner 104. Main line liner 103 can comprise membrane 105 and felt layer 106. Main line liner 103 can be a flat sheet as shown in FIG. 2.

CIPP liner 102 can be impregnated with a resin, epoxy, or the like, which allows CIPP liner 102 to harden after it is installed into a pipe line. As used herein, the term "resin" can refer to resin and/or epoxy and the usage will be clear to the ordinarily skilled artisan when considering the context. CIPP liner 102 can be cured using a curing medium such as hot water, hot air, steam, or the like. CIPP liner 102 can be cured by directing a curing medium to bladder 101 that has CIPP liner 102 positioned on it, thus initiating the curing reaction that can cause CIPP liner 102 to harden.

In certain embodiments, main line liner 103 can be disk-shaped and form a brim-shape when attached to CIPP lateral liner 104. A brim-shaped portion of main line liner 103 can be positioned in a host pipe so that a brim portion of main line liner 103 is positioned within a main pipe while CIPP lateral liner 104 is positioned in a lateral pipe. A brim-shaped portion can be positioned so that it is flush against the inside of a main line pipe after CIPP liner 102 has been inserted into a pipe line and CIPP liner 102 envelopes the juncture between the main line pipe and the lateral pipe, and the lateral portion of CIPP liner 102 lines the inside of the lateral pipe.

Referring to FIGS. 2-7, CIPP lateral liner 104 can comprise CIPP lateral liner membrane 107 and CIPP lateral liner felt layer 108. Bladder 101 can comprise main liner bladder 109 and lateral installation bladder 110. Bladder 101 can comprise layflat hose 111. Bladder 101 can comprise pull-in cable 112.

FIG. 2 shows first end 104a of CIPP lateral liner 104 can be folded into a shape, such as a U-shape, prior to inserting first end 104a of CIPP lateral liner 104 into first end 110a of lateral installation bladder 110. Lateral installation bladder 110 can be slightly cupped at first end 110a so that first end 104a of CIPP lateral liner 104 can be inserted therein. CIPP lateral liner 104 can be inserted so that CIPP lateral liner membrane 107 is directly contacting an inner diameter of lateral installation bladder 110. Folding first end 104a of CIPP lateral liner 104 into a shape, such as a U-shape, can allow CIPP lateral liner 104 to fit in first end 110a of lateral installation bladder 110 and provide for friction when lateral installation bladder 110 is pulled into main line bladder 109. Pull-in cable 112 can be used to pull CIPP lateral liner 104 and lateral installation bladder 110 into bladder 101. CIPP lateral liner 104 along with corresponding lateral installation bladder 110 can be pulled inside of main line bladder 109 so that the entire assembly can be moved through and positioned in a damaged pipe line.

Figure 3:
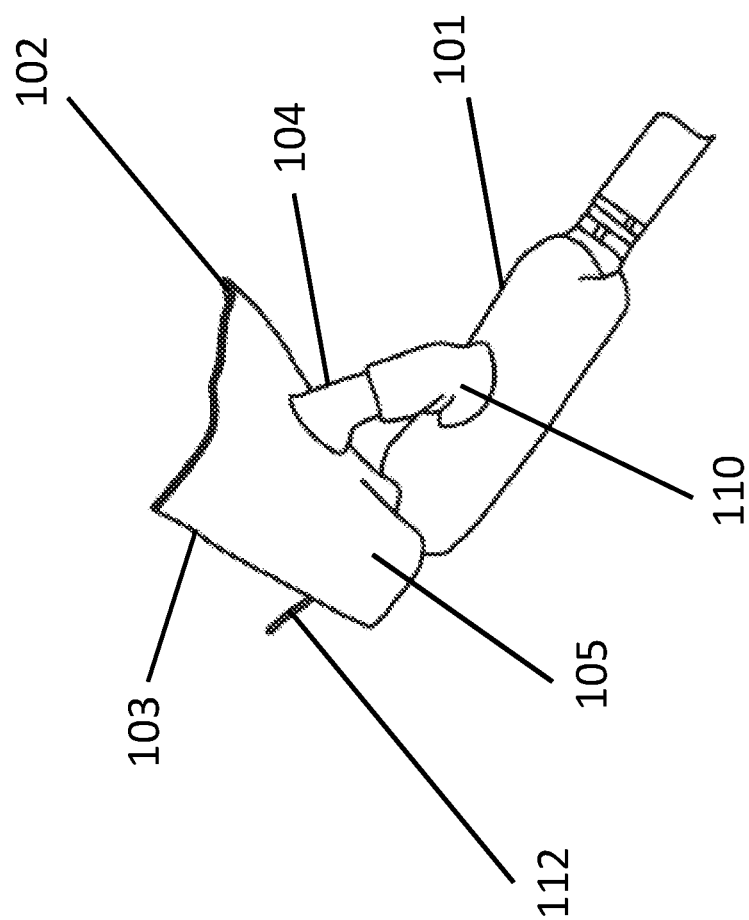
FIG. 3 shows another view of one CIPP liner of embodiments of the present invention as it is being inserted into a bladder.

FIG. 3 shows CIPP liner 102 as it is inserted into bladder 101. CIPP lateral liner 104 can be inserted into lateral installation bladder 110 until a membrane 105 of main line liner 103 is flush with main liner bladder 109 once the full length of CIPP lateral liner 104 is inserted into lateral installation bladder 110.

In some embodiments, CIPP lateral liner 104 is not inserted into lateral installation bladder 110, which can allow for CIPP liner 100 to be used in pull-in-place installations. When using an embodiment with a pull-in-place installation, CIPP lateral liner 104 may not be pulled inside of bladder 101 and when installing CIPP liner 102 into a pipe, CIPP lateral liner 104 can be pulled into a lateral pipe line and then a lateral installation bladder 110 can be inflated, being inserted into CIPP lateral liner 104. CIPP liner 102 can be cured as described herein once it has been positioned using a pull-in-place installation.

Figure 4:
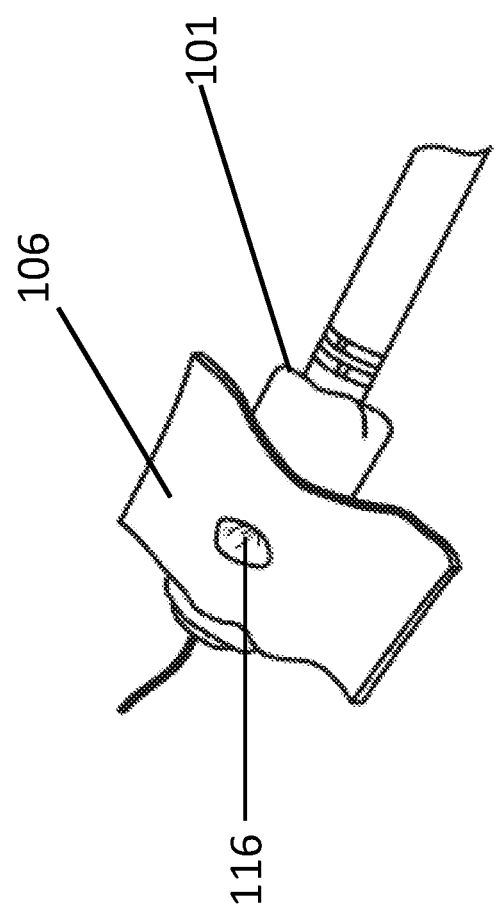
FIG. 4 shows a view of one CIPP liner of embodiments of the present invention showing a main line liner before it is wrapped around a bladder.

FIG. 4 shows main line liner 103 once it is flush with main liner bladder 109 and the full length of CIPP lateral liner 104 has been inserted into lateral installation bladder 110, and both CIPP lateral liner 104 and lateral installation bladder 110 are inside main liner bladder 109. Liner opening 116 is shown prior to insertion of CIPP liner assembly 100 into a damaged pipe line and liner opening 116 can be aligned with the juncture once CIPP liner assembly 100 is inserted into a pipe line. Lateral installation bladder 110 and CIPP lateral liner 104 may be positioned within bladder 101 until lateral installation bladder 110 is inverted inside a lateral pipe to be repaired.

Figure 5:
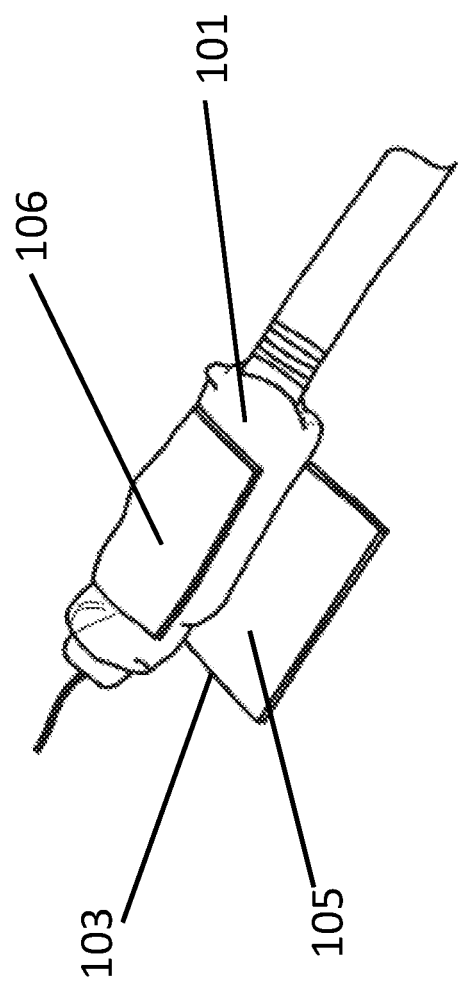
FIG. 5 shows a view of one CIPP liner of embodiments of the present invention with a main line liner as it is wrapped around a bladder.

FIG. 5 shows main line liner 103 as it is wrapped around a bladder 101 so that the ends of main line liner 103 can overlap. The ends of main line liner 103 may overlap at a distance configured to allow edges of main liner 103 to overlap and expand to main line pipe without separating and/or leaving a gap between main liner 103 edges when CIPP liner 102 is inflated during installation. In certain embodiments, overlap of edges of main line liner 103 may be between about 1-3 inches, about 1-5 inches, about 1-10 inches, and ranges therebetween depending on the specifications determined for that specific repair. Main line liner 103 can then be held in place on main liner bladder 109 using any suitable securing device, for example, rubber bands, o-rings including but not limited to hydrophilic o-rings, elastic bands, twist-ties, zip-ties and the like. In certain embodiments, a securing device is configured so that it has a tensile strength designed to break once bladder 101 is inflated during installation of CIPP liner 102. Main line liner 103 can be secured around bladder 101 so that membrane 105 is directly contacting bladder 101 with felt layer 106 facing outward toward the inner diameter of main pipe line 113.

Figure 6:
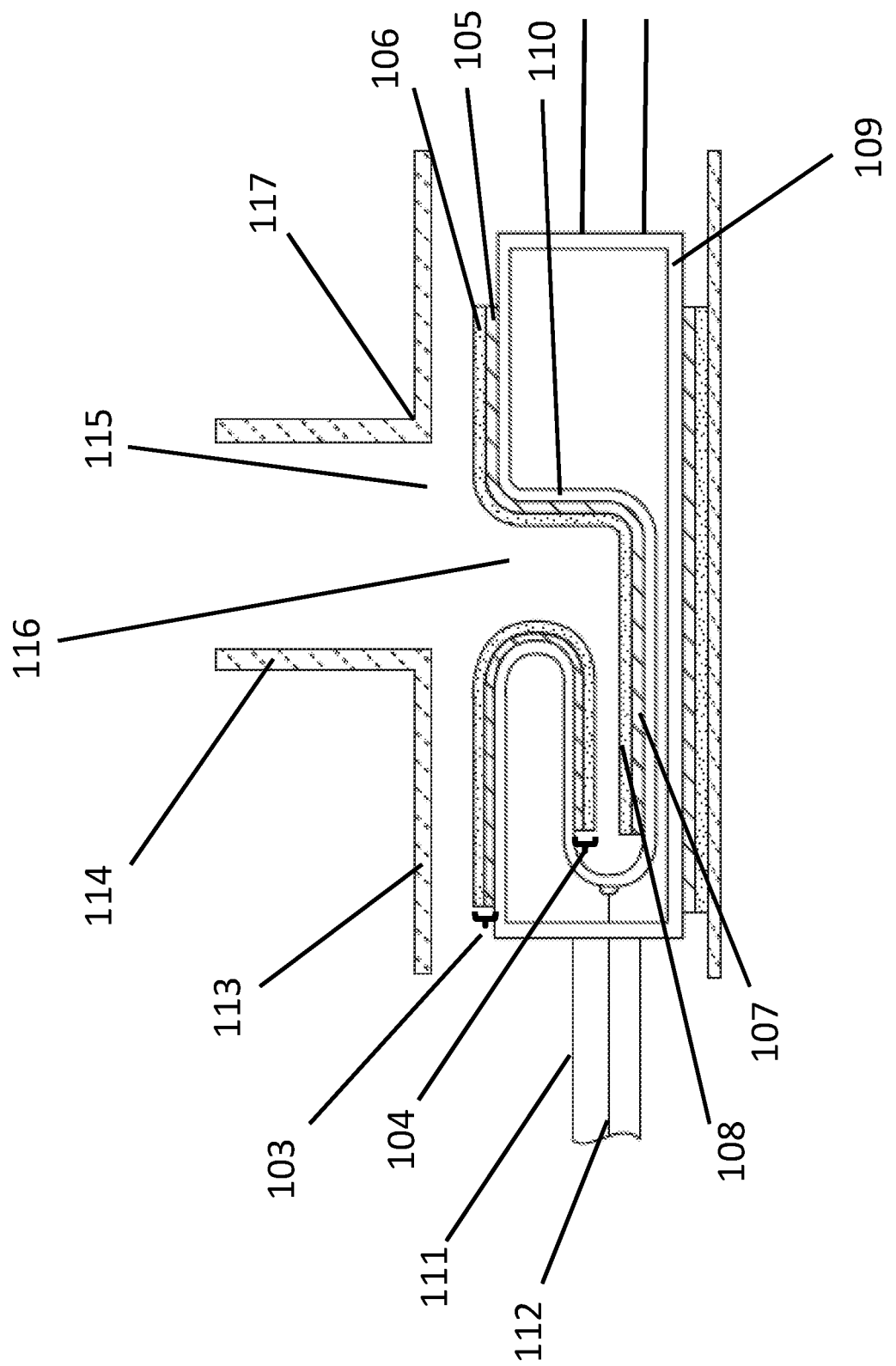
FIG. 6 shows a sectional view of a CIPP liner of embodiments of the present invention with a main line liner after it has been inserted into a bladder and the assembly has been inserted into a pipe line.
Figure 7:
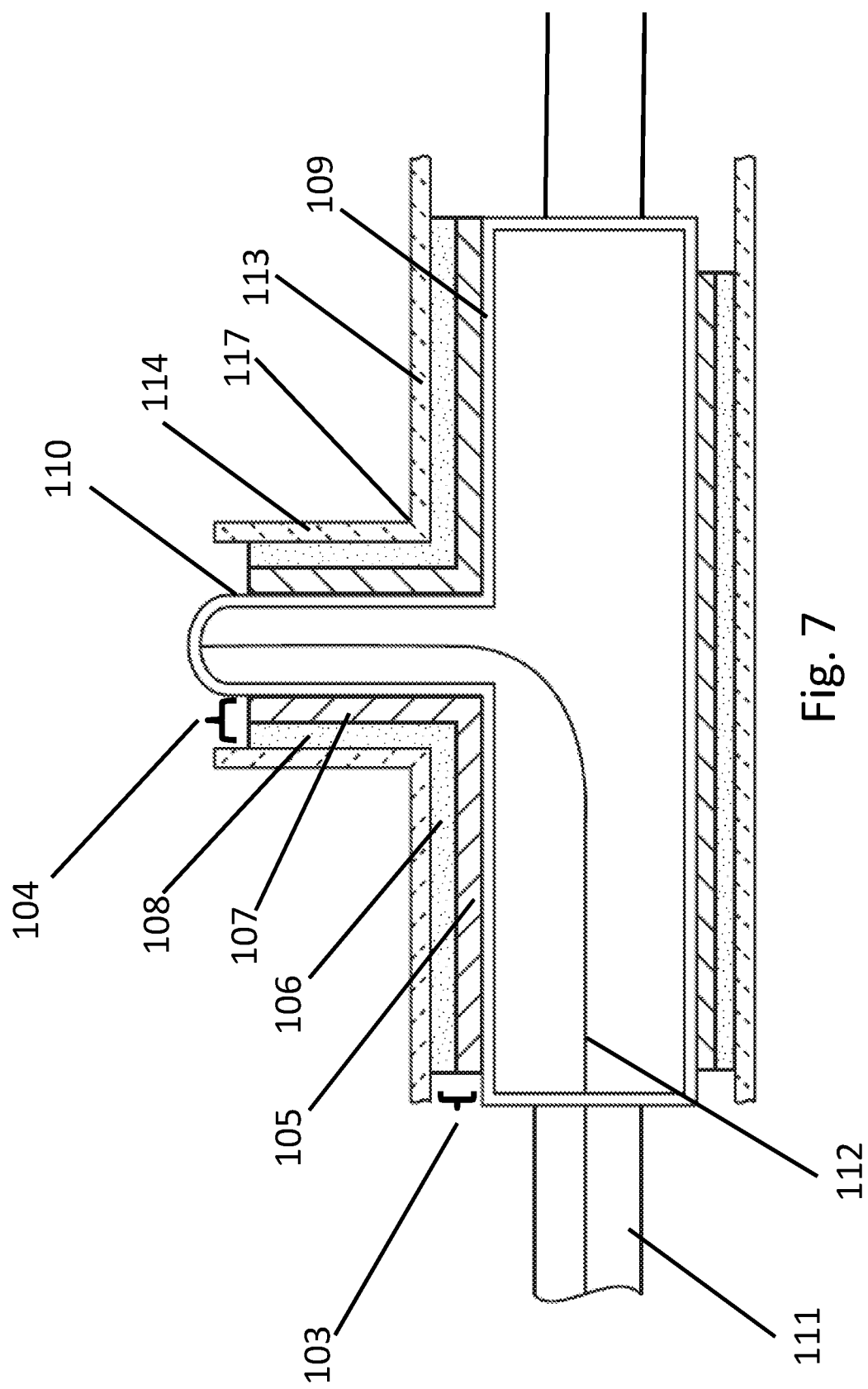
FIG. 7 shows a sectional view of one CIPP liner with a main line liner after a CIPP lateral liner has been inverted into a lateral pipe line.

CIPP liner assembly 100 can then be inserted into a pipe line to be repaired as shown in FIG. 6. A pipe line to be repaired can comprise main pipe line 113 and lateral pipe line 114. CIPP liner assembly 100 can be positioned so that liner opening 116 is aligned with lateral pipe line 114. By positioning liner opening 116 beneath lateral pipe line 114 and aligning liner opening 116 with lateral opening 115, lateral installation bladder 110 and CIPP lateral liner 104 can be inverted into lateral pipe line 114 as shown in FIG. 7. This can be done when bladder 101 is filled with air, steam, water, or the like, to cure the CIPP lateral liner 104 and main line liner 103 to repair and seal juncture 117.

CIPP liner assembly 100 can be positioned using a closed-circuit television (CCTV) camera that is inserted into a pipe line prior to inserting CIPP liner assembly 100. This way, a repair can be properly assessed, allowing proper positioning and sizing of repair materials.

After bladder 101 is inflated, CIPP lateral liner 104 can be fully extended into lateral pipe line 114 after being inverted as is shown in FIG. 7. Bladder 101 can be filled with water, steam, or the like to heat a resin, which has been impregnated into CIPP lateral liner 104 and main line liner 103. Heating a resin as described can cause the resin to cure and harden. A resin can also be cured at ambient temperature. After main line liner 103 and CIPP lateral liner 104 have hardened, bladder 101 can be de-inverted out of CIPP lateral liner 104, which can be performed by pulling pull-in cable 112, causing lateral installation bladder 110 to be pulled out of lateral pipe line 114 into main liner bladder 109, which can allow for bladder 101 to be removed from a host pipe line while the main line liner 103 and CIPP lateral liner 104 remain in place.

By inserting CIPP liner 102 so that membrane 105 and CIPP lateral liner membrane 107 directly contact bladder 101, unexpectedly superior results can be produced because installed CIPP liner 102 as described herein can have a resin saturated felt layer 106 positioned against a pipe line wall so that a resin saturated felt layer can directly contact a pipe line inner wall, which can also allow resin to enter cracks, openings, or other defects in a pipe line inner wall, which can result in a locking effect that adheres CIPP liner 102 to a pipe line and improves the reliability and strength of an installed CIPP liner. By positioning a cured CIPP liner so that its membrane faces the inside of a pipe line, flow disturbances caused by, e.g. water, are unexpectedly diminished, reducing the coefficient of friction resulting in unexpectedly enhanced flow characteristics of the repaired pipe line and an unexpectedly superior pipe repair. Positioning a CIPP liner so that a membrane makes contact with a bladder, can produce the unexpectedly superior results of extending the lifetime of a bladder because this arrangement can reduce or eliminate resin contacting the bladder. Contact with resin can cause a bladder to deteriorate or experience a diminished lifespan. In some embodiments a bladder does not comprise a coating. A bladder may also comprise a coating that can allow a membrane to easily release from a bladder during installation. In some embodiments, a coating can be an oil, a silicone, a lubricant, a dish detergent, a gel, a protective liquid, a powder, a mold release, a grease, or any other suitable coating.

Figure 8:
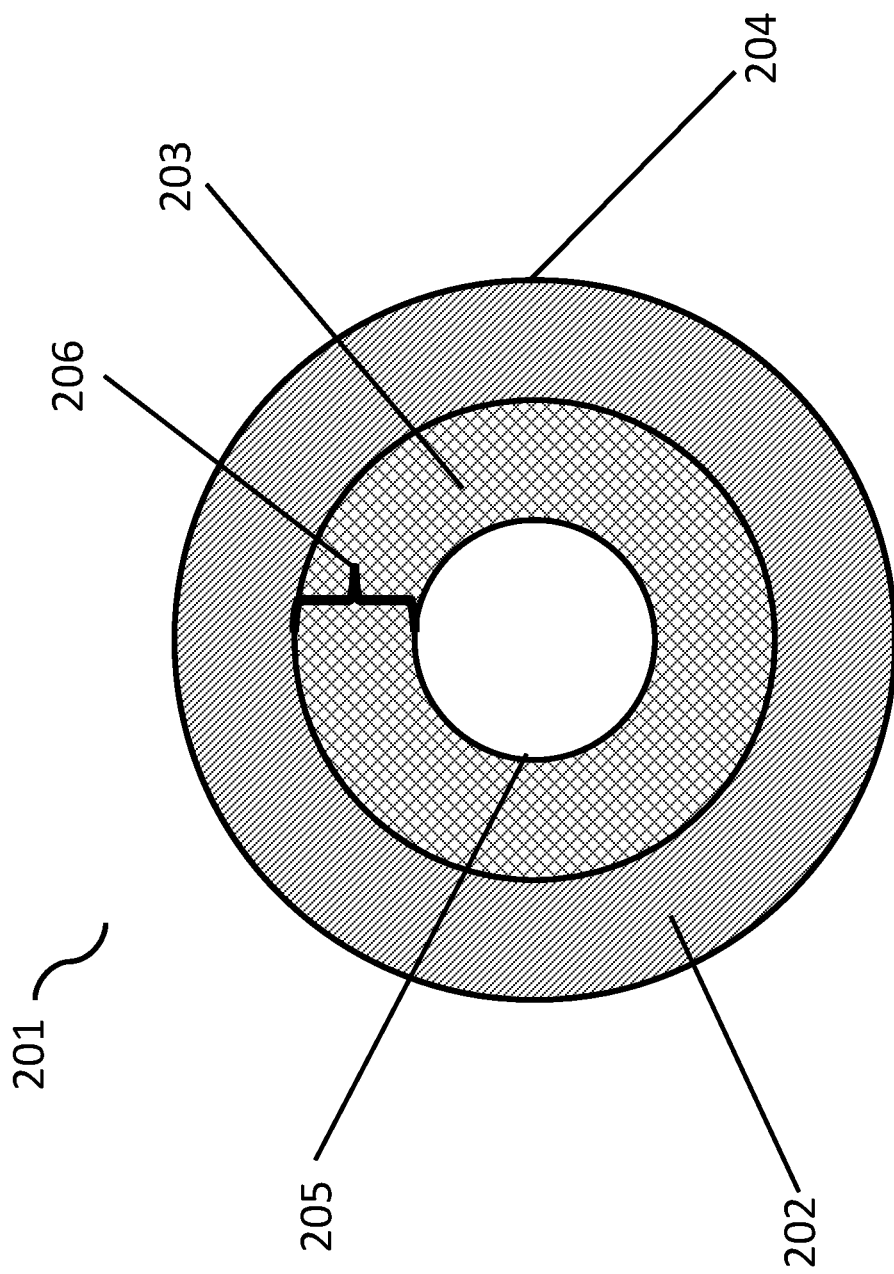
FIG. 8 shows a backing ring useful in certain embodiments.

In certain embodiments, a CIPP liner assembly can also comprise a backing ring. FIG. 8 shows an example of a backing ring 201. Backing ring 201 can comprise bonded portion 202 and unbonded portion 203. Backing ring 201 can comprise outer diameter 204 and inner diameter 205. Unbonded portion 203 can form pocket 206, in which a hydrophilic material can be positioned and/or inserted.

Figure 9:
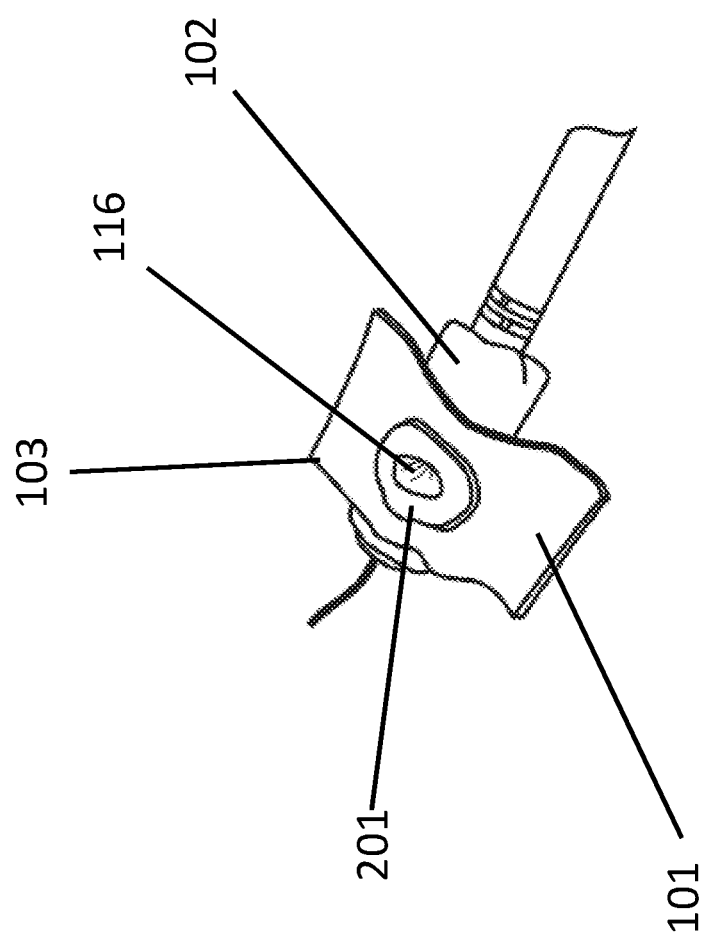
FIG. 9 shows one positioning of a backing ring on a CIPP liner of embodiments of the present invention on a bladder prior to a main line liner being wrapped around the bladder.
Figure 11:
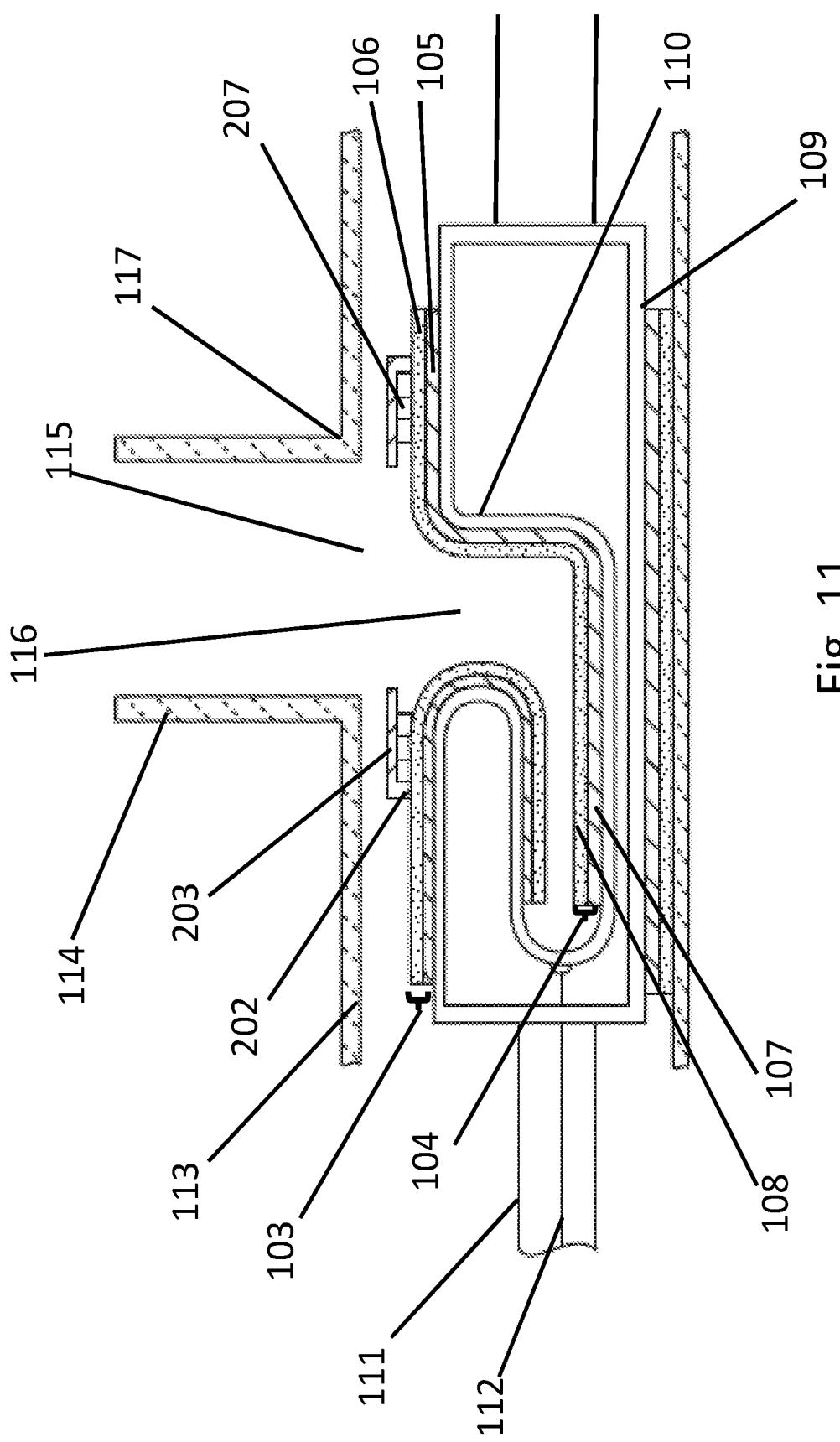
FIG. 11 shows a sectional view of one CIPP liner of embodiments of the present invention containing a backing ring positioned for repair of a lateral pipe line.

FIG. 9 shows one embodiment of positioning backing ring 201 on a CIPP liner assembly 100 prior to insertion and installation into a pipe line as shown in FIG. 11.

FIG. 9 also shows main line liner 103 and CIPP lateral liner 104 positioned in bladder 101. Backing ring 201, can be positioned on or around lateral opening 115. CIPP lateral liner 104 can be attached to main line liner 103. Backing ring 201 can be positioned on main line liner 103 so that a downward facing side is directly contacting a main line liner 103. Backing ring 201 can be attached by bonding a portion of backing ring 201 to main line liner 103 forming bonded portion 202 as was shown in FIG. 8. In certain embodiments, backing ring 201 can be bonded to felt layer 106 of main line liner 103. In certain embodiments, backing ring 201 can be directly bonded to felt layer 106 of CIPP liner 102. In certain embodiments, backing ring 201 can be bonded to membrane 105. In certain embodiments, backing ring 201 can be bonded directly to membrane 105 and/or CIPP lateral liner membrane 107. Backing ring 201 comprising a bonded portion can comprise an unbonded portion 203. In certain embodiments, unbonded portion 203 comprises pocket 206 that can also comprise a hydrophilic material.

In certain embodiments, CIPP liner assembly 100 may comprise a hydrophilic material. Hydrophilic material can be positioned at or near lateral opening 115 once a CIPP liner assembly 100 with backing ring 201 is positioned in a pipe line. A hydrophilic material can be a paste, liquid, gel, caulk, mastic, any combination thereof, a pre-formed shape comprised of any of these and combinations of these, and the like. An example of such a material is ULTRASEAL commercially available from OCM/ADEKA USA CORPORATION. In some embodiments, the hydrophilic material can swell when it is contact with water. In certain embodiments, CIPP liner assembly 100 may comprise backing ring 201 and hydrophilic material. In certain embodiments, a hydrophilic material may be substituted with a hydrophobic material, such as wax, hydrophobic rubber, hydrophobic paste, hydrophobic gel, and the like.

In certain embodiments, half of a surface area of backing ring 201 can be bonded to CIPP liner 102. In certain other embodiments, less than half of a surface area of backing ring 201 can be bonded to CIPP liner 102. A backing ring 201 can be configured so that it covers a portion of main line liner 103, which can cover a pre-determined area of main line liner 103 and retain a hydrophilic material and cover a portion of a juncture to allow for adequate retention of hydrophilic material. Backing ring 201 can have inner and outer diameters that are sized to achieve this desired coverage. Depending on the specifications, a bonded surface area of backing ring 201 can be between about 5-10%, 5-20%, 5-20%, 5-30%, 5-40%, 5-50%, 5-60%, 5-70%, 5-80%, 65-85%, 60-90%, and ranges therebetween. In certain embodiments, backing ring can be positioned so that a portion of backing ring 201 overhangs liner opening 116. Backing ring 201 can be positioned so that backing ring 201 contacts CIPP lateral liner 104 and main line liner 103 after CIPP lateral liner 104 has been inverted into lateral pipe line 114. When backing ring 201 is used in this way, it can be positioned so that a first portion of backing ring 201 is contacting main line liner 103 and a second portion is contacting CIPP lateral liner 104.

In certain embodiments backing ring 201 can comprise an unbonded portion. In certain embodiments an unbonded surface area of a backing ring can be between about 1-10%, 1-20%, 10-20% 5-20%, 5-30%, 5-40%, 5-50%, 5-60%, 5-70%, 5-80%, 15-35%, and ranges therebetween.

Figure 10:
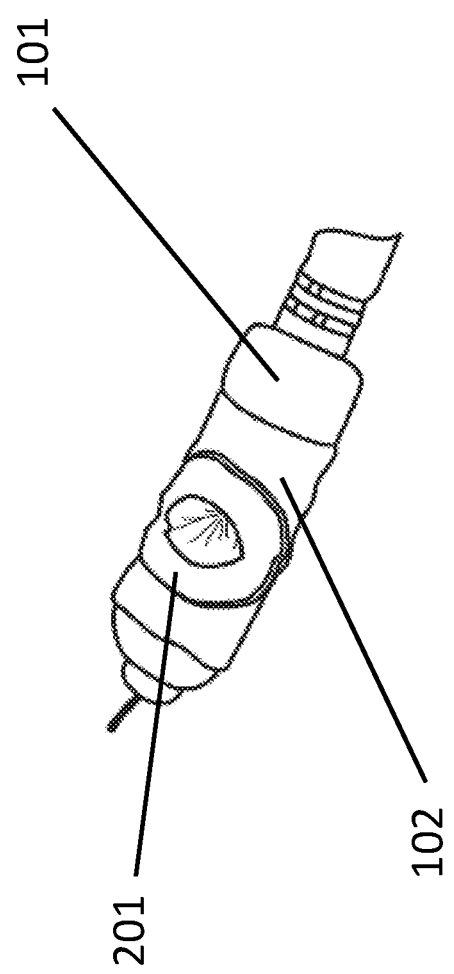
FIG. 10 shows one positioning of a backing ring on a CIPP liner of embodiments of the present invention prior to installation into a pipe line.

FIG. 10 shows an embodiment where backing ring 201 is positioned on CIPP liner 102 that is positioned on a bladder 101 as described herein.

FIG. 11 shows an embodiment where CIPP liner assembly 100 comprises backing ring 201 that is positioned inside of a pipe line to be repaired. A pipe line to be repaired can comprise a main pipe line 113 and a lateral pipe line 114. CIPP liner assembly 100 is positioned so that liner opening 116 is aligned with lateral opening 115 of lateral pipe line 114. By positioning liner opening 116 beneath lateral pipe line 114 and aligning it with lateral opening 115, lateral installation bladder 110 and CIPP lateral liner 104 can be inverted into lateral pipe line 114 as shown in FIG. 12 when bladder 101 is filled with air, steam, water, or the like.

Figure 12:
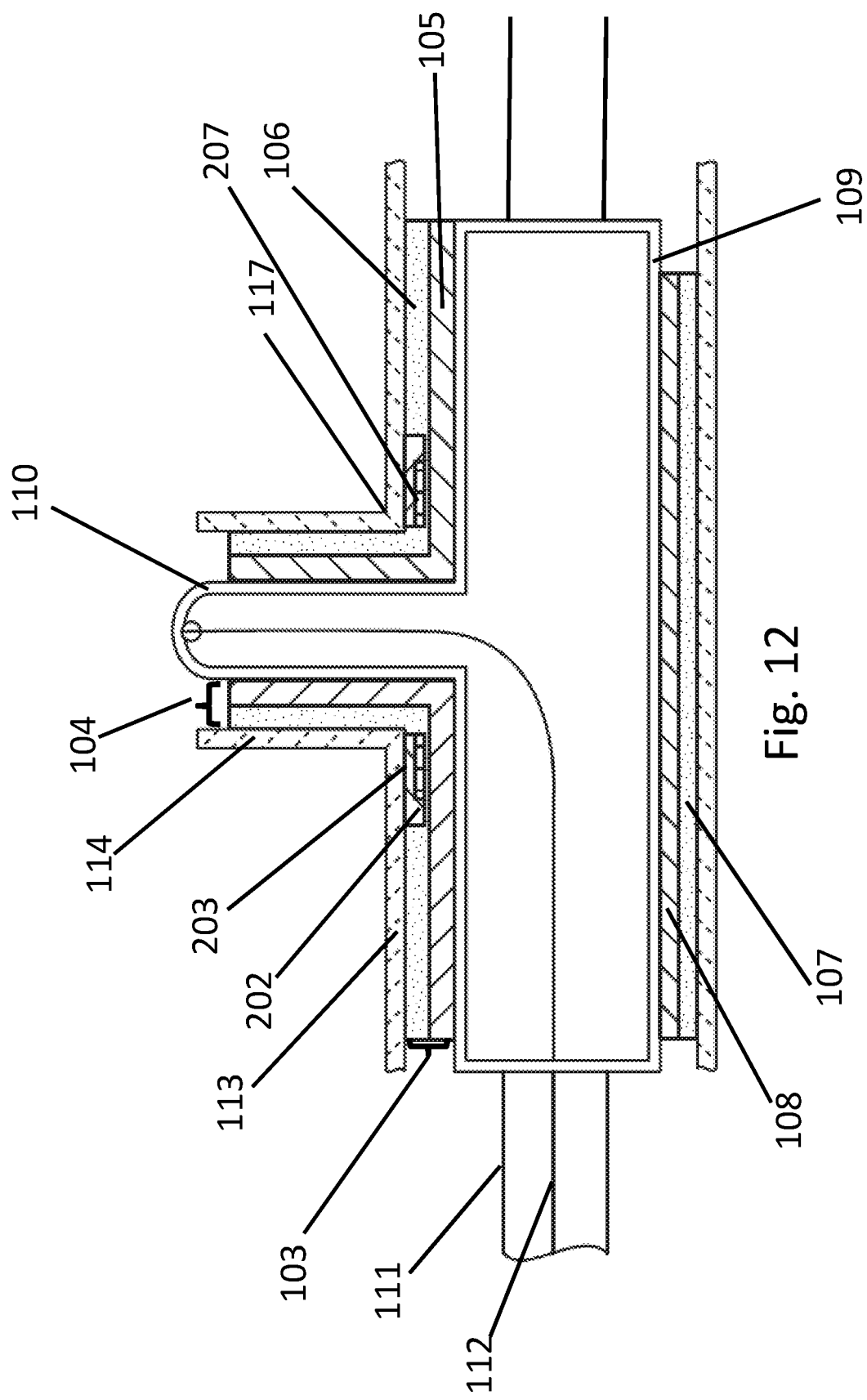
FIG. 12 shows a sectional view of one CIPP liner of embodiments of the present invention after being inverted into a lateral pipe line.

FIG. 12 shows positioning of backing ring 201 on main line liner 103 after CIPP lateral liner 104 has been inverted into lateral pipe line 114. During inversion, CIPP lateral liner 104 is positioned within lateral pipe line 114, and CIPP liner 102 can seal juncture 117 and position backing ring 201 at or near juncture 117. Backing ring 201 can be positioned so that pocket 206 is formed between the edge of an inner diameter 205 of backing ring 201 and inverted CIPP lateral liner 204. Pocket 206 can allow hydrophilic material 207 to interact with any water that enters the pipe line, causing the hydrophilic material 207 to swell and seal the pipe line at juncture 117 or thereabout.

In certain embodiments, backing ring 201 can have an inner diameter 205 that is approximately equal, or slightly smaller to the diameter of lateral opening 115, which can be approximately equal to an outer diameter of liner opening 116 of CIPP lateral liner 104. An edge of an inner diameter of backing ring 201 can be flush with CIPP lateral liner 104 after inversion, thus positioning hydrophilic material 207 between main line liner 103 and backing ring 201. Backing ring 201 can be compressed against the inner diameter of main pipe line 113 and/or lateral pipe line 114. In certain embodiments, hydrophilic material 207 cannot make direct contact with a pipe line. In certain embodiments, hydrophilic material 207 can interact with water that enters a pipe line when the hydrophilic material 207 is held between main line liner 103, CIPP lateral liner 104, and backing ring 201. Backing ring 201 can be resin-saturated or not resin-saturated. Backing ring 201 can comprise a material that dissolves after contact with liquids such as water. In certain embodiments, a backing ring 201 can comprise a material that dissolves when it contacts water and a dissolving backing ring 201 can be positioned on a main line liner 103 with a hydrophilic material, so that after backing ring 201 dissolves, hydrophilic material is left in place at a juncture.

In certain embodiments, backing ring 201 can comprise a felt material such as a needled felt. Backing ring 201 may comprise a felt material, a needled felt material, a knit material, a polyester, a glass material, a fiberglass material, and mixtures thereof. In certain embodiments, backing ring 201 material may comprise a felt layer that may comprise a felt material comprising a fiberglass. In certain embodiments, backing ring 201 may comprise a membrane. In certain embodiments, backing ring 201 may comprise a water-permeable material. In certain embodiments, backing ring 201 may comprise a water-impermeable material.

In certain embodiments, hydrophilic material 207 can be positioned in pocket 206 of backing ring 201. Placing hydrophilic material in this positioning can allow water that has entered into a leaking pipe to interact with the hydrophilic material, causing it to swell and create a seal in the damaged pipeline.

In certain embodiments, hydrophilic material 207 can be positioned on CIPP liner 102 without backing ring 201. In certain embodiments, hydrophilic material 207 can be positioned at, near, or around liner opening 116 without backing ring 201.

In certain embodiments, backing ring 201 can be positioned so that water may directly interact with a hydrophilic material 207 positioned in backing ring pocket 206. In certain embodiments, backing ring 201 can be made of a water permeable material so that water may pass through backing ring 201 and interact with hydrophilic material 207 positioned in backing ring pocket 206. By positioning hydrophilic material 207 in backing ring pocket 206, hydrophilic material 207 remains in place and is not removed, altered, or wiped away when CIPP liner 102 is being positioned in a pipe line. The devices and methods described herein thus provide the unexpectedly superior results of forming a better seal at a pipe juncture. Positioning hydrophilic material 207 in backing ring pocket 206 also provides the unexpectedly superior results of being sized so that the optimal amount of hydrophilic material 207 is positioned at juncture 117. In some embodiments, backing ring 201 can form a useful pocket 206 for delivering hydrophilic material to a juncture 117.

Backing ring 201 can be positioned on main line liner 103 so that it will be at or around the juncture 117 after CIPP lateral liner 104 is inverted into lateral pipe line 114. Backing ring 201 can be bonded to main line liner 103. Bonding can be done via heat, resins, adhesives, stitching, epoxies, glue, tape, or the like.

Backing ring 201 can have an outer diameter of about 3 inches to about 14 inches and distances there between. Backing ring 201 may comprise an outer diameter of about 3-5 inches, 5-7 inches, 7-9 inches, 9-12 inches, 12-14 inches, 5-10 inches, and ranges therebetween, along with metric equivalents or approximations.

A main pipe line can have a diameter between about 4-6 inches, about 4-8 inches, about 4-12 inches, about 6-12 inches, about 8-10 inches, about 8-12 inches, about 12-24 inches, about 12-48 inches, greater than about 48 inches, and ranges therebetween. A lateral pipe line can be 4-6 inches, about 4-8 inches, about 4-12 inches, about 6-12 inches, about 8-10 inches, about 8-12 inches, about 12-24 inches, about 12-48 inches, greater than about 48 inches, and ranges therebetween, along with common metric equivalents or approximations.

Backing ring 201 can have an inner diameter of about 1.5 inches to about 8 inches and distances there between. Backing ring 201 may comprise an inner diameter of about 1.5-3 inches, 3-5 inches, 5-7 inches, 5-8 inches, 3-7 inches, 3.5-5 inches, and ranges therebetween, along with metric equivalents or approximations.

In certain embodiments, backing ring 201 is circular in shape. In certain embodiments, backing ring 201 is ovular in shape. In certain embodiments, backing ring 201 comprises an outer diameter having a circular shape and comprises an inner diameter having an ovular shape. In certain embodiments, backing ring 201 is configured to be used with a T-shaped liner assembly. In certain embodiments, backing ring 201 is configured for use with a Y-shaped liner assembly.

In certain embodiments, the CIPP liner assemblies as described herein can comprise a T-shaped or a Y-shaped CIPP liner.

Backing ring 201 can help strengthen CIPP liner 102 at the area around where main line liner 103 and CIPP lateral liner 104 are joined. Backing ring 201 can also help strengthen CIPP liner 102 at juncture 117 once CIPP liner 102 has been cured By strengthening CIPP liner 102, hydrophilic material 207 can be more effectively positioned in this area. Backing ring 201 can stabilize lateral opening 115 so that, during inversion, CIPP lateral liner 104 is more likely to be properly inserted into lateral pipe line 114. By incorporating a backing ring as disclosed herein, these unexpectedly superior results can be achieved.

As used herein, the term CIPP liner can mean a main line liner, a CIPP lateral liner, or the combination of these. The meaning of these terms will be clear to the skilled artisan when viewed in context.

As used herein, the term membrane can mean a membrane, a main line liner membrane, a CIPP lateral liner membrane, or the combination of these. The meaning of these terms will be clear to the skilled artisan when viewed in context.

As used herein, the term bladder can mean a main liner bladder, a lateral installation bladder, an inflation bladder, a calibration hose, or the combination of these. The meaning of these terms will be clear to the skilled artisan when viewed in context.

As used herein, the terms "invert" (and its other tenses) may be used interchangeably with "evert" (and its other tenses) depending on the perspective of that which is being described (e.g., inverting or everting a liner) and the meaning of these terms will be clear to the skilled artisan when viewed in context.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A backing ring comprising:
   an inward facing portion and an outward facing portion;
   a first edge portion around an outer circumference of said backing ring, and a second edge portion around an inner circumference of said backing ring;
   wherein said inward-facing portion is adapted to be attached to a cured-in-place pipe liner;
   said backing ring further comprises a bonded portion and an unbonded portion and said unbonded portion comprises a pocket adapted to hold a hydrophilic material within said pocket between said unbonded portion and said cured-in-place pipe liner to inhibit said hydrophilic material from contacting an inner surface of a main line pipe;
   said backing ring is positioned on or around a lateral opening of said cured-in-place pipe liner; and
   said backing ring comprising a felt.

2. An apparatus, comprising:
   a cured-in-place pipe liner;
   a backing ring comprising:
   an inward-facing portion,
   an outward-facing portion,
   a first edge portion around an outer circumference of said backing ring, and a second edge portion around an inner circumference of said backing ring; wherein said inward-facing portion is attached to said cured-in-place pipe liner;
   said backing ring further comprises a bonded portion and an unbonded portion and said unbonded portion comprises a pocket adapted to hold a hydrophilic material within said pocket between said unbonded portion and said cured-in-place pipe liner to inhibit said hydrophilic material from contacting an inner surface of a main line pipe; and
   said backing ring is positioned on or around a lateral opening of said cured-in-place pipe liner.

3. The apparatus of claim 2, further comprising a hydrophilic material positioned in said pocket.

4. The apparatus of claim 2, wherein said backing ring comprises felt.

5. The apparatus of claim 2, wherein said backing ring is sized so that said inner circumference is larger than said lateral opening of said cured-in-place pipe liner.

6. The apparatus of claim 2, wherein said inner circumference is circular.

7. The apparatus of claim 2, wherein said inner circumference is ovular.

8. The apparatus of claim 2, wherein said backing ring comprises an inner diameter that is about 1½ inches to about 8 inches in diameter.

9. The apparatus of claim 2, wherein said backing ring comprises an outer diameter that is about 3 inches to about 14 inches in diameter.

10. The apparatus of claim 2, wherein said bonded portion is bonded to said cured-in-place pipe using heat.

11. A method of repairing a lateral junction of a pipe, the method comprising:
    providing a cured-in-place pipe liner;
      providing a backing ring comprising:
      an inward-facing portion,
    an outward-facing portion,
    a first edge portion around an outer circumference of said backing ring, and a second edge portion around an inner circumference of said backing ring; wherein said inward-facing portion is attached to said cured-in-place pipe liner;
    positioned on or around a lateral opening of said cured-in-place pipe liner;
      bonding a portion of said backing ring to said cured-in-place pipe liner; and
    forming an unbonded portion of said backing ring comprising a pocket adapted to hold a hydrophilic material within said pocket between said unbonded portion and said cured-in-place pipe liner to inhibit said hydrophilic material from contacting an inner surface of a main line pipe.

12. The method of claim 11, further comprising positioning a hydrophilic material into said pocket.

13. The method of claim 12, further comprising positioning said cured-in-place pipe liner in proximity to a lateral junction.

14. The method of claim 13, further comprising everting a lateral pipe liner into a lateral pipe and compressing said hydrophilic material between said cured-in-place pipe liner and said backing ring while pressing said outward-facing portion of said backing ring against the inside of a pipe.

15. The method of claim 13, further comprising everting a lateral pipe liner into a lateral pipe and compressing said hydrophilic material between said cured-in-place pipe liner and said backing ring while pressing said outward-facing portion of said backing ring against a juncture of a main pipe and a lateral pipe.

16. A method of positioning a cured-in-place (CIPP) liner on a bladder, the steps comprising:
    providing a CIPP liner wherein said CIPP liner comprises a main line liner and a CIPP lateral liner and the CIPP lateral liner is attached to said main line liner, forming a T-shape;
    providing a bladder wherein said bladder comprises a main liner bladder and a lateral installation bladder and said lateral installation bladder is attached to said main liner bladder, forming a T-shape;
    forming a U-shape with a first end of said CIPP lateral liner;

inserting said U-shaped first end of said CIPP lateral liner into a first end of a lateral installation bladder so that a CIPP lateral liner membrane faces an inner diameter of said lateral installation bladder;

positioning said CIPP lateral liner and said lateral installation liner inside of said main liner bladder;

wrapping said main line liner comprising a felt layer and a membrane around said main liner bladder so that said membrane is facing an outer diameter of said main liner bladder;

attaching a backing ring to said felt layer of said main line liner, wherein the backing ring comprises a first edge portion around an outer circumference of said backing ring, and a second edge portion around an inner circumference of said backing ring;

wherein said inward-facing portion is attached to said cured-in-place pipe liner;

said backing ring further comprises a bonded portion and an unbonded portion and said unbonded portion comprises a pocket adapted to hold a hydrophilic material within said pocket between said unbonded portion and said cured-in-place pipe liner to inhibit said hydrophilic material from contacting an inner surface of a main line pipe; and securing said main line liner to said bladder.

17. The method of claim 16, wherein said CIPP lateral liner further comprises a CIPP lateral liner felt layer.

18. The method of claim 17, further comprising the step of impregnating said CIPP lateral liner felt layer with a resin prior to inserting said CIPP lateral liner into said lateral installation bladder.

19. The method of claim 18, further comprising the step of applying a vacuum to said CIPP lateral liner prior to impregnating said CIPP lateral liner felt layer with said resin.

20. The method of claim 16, further comprising the step of impregnating said felt layer of said main line liner with a resin prior to wrapping said main line liner around said main liner bladder.

21. An apparatus comprising:
a CIPP liner comprising a main line liner and a CIPP lateral liner;
a bladder comprising a main liner bladder and a lateral installation bladder;
wherein said main line liner comprises a felt layer and a membrane and a backing ring; wherein a first edge portion around an outer circumference of said backing ring, and a second edge portion around an inner circumference of said backing ring;
wherein said inward-facing portion is attached to said cured-in-place pipe liner;
said backing ring further comprises a bonded portion and an unbonded portion and said unbonded portion comprises a pocket adapted to hold a hydrophilic material within said pocket between said unbonded portion and said cured-in-place pipe liner to inhibit said hydrophilic material from contacting an inner surface of a main line pipe:
wherein said CIPP lateral liner comprises a CIPP lateral liner felt layer and a CIPP lateral liner membrane;
wherein said felt layer is positioned so that it is contacting said main line liner;
wherein said CIPP lateral liner is positioned inside of said lateral installation bladder and said CIPP lateral liner and said lateral installation bladder are positioned inside of said main liner bladder; and
said CIPP lateral liner membrane is positioned so that it is contacting said lateral installation bladder.

22. The apparatus of claim 21, wherein said CIPP lateral liner felt layer does not make direct contact with said lateral installation bladder.

* * * * *